No. 740,705. PATENTED OCT. 6, 1903.
F. J. SMITH.
COMBINED HEATING AND COOKING STOVE.
APPLICATION FILED MAR. 27, 1902.
NO MODEL. 2 SHEETS—SHEET 1.
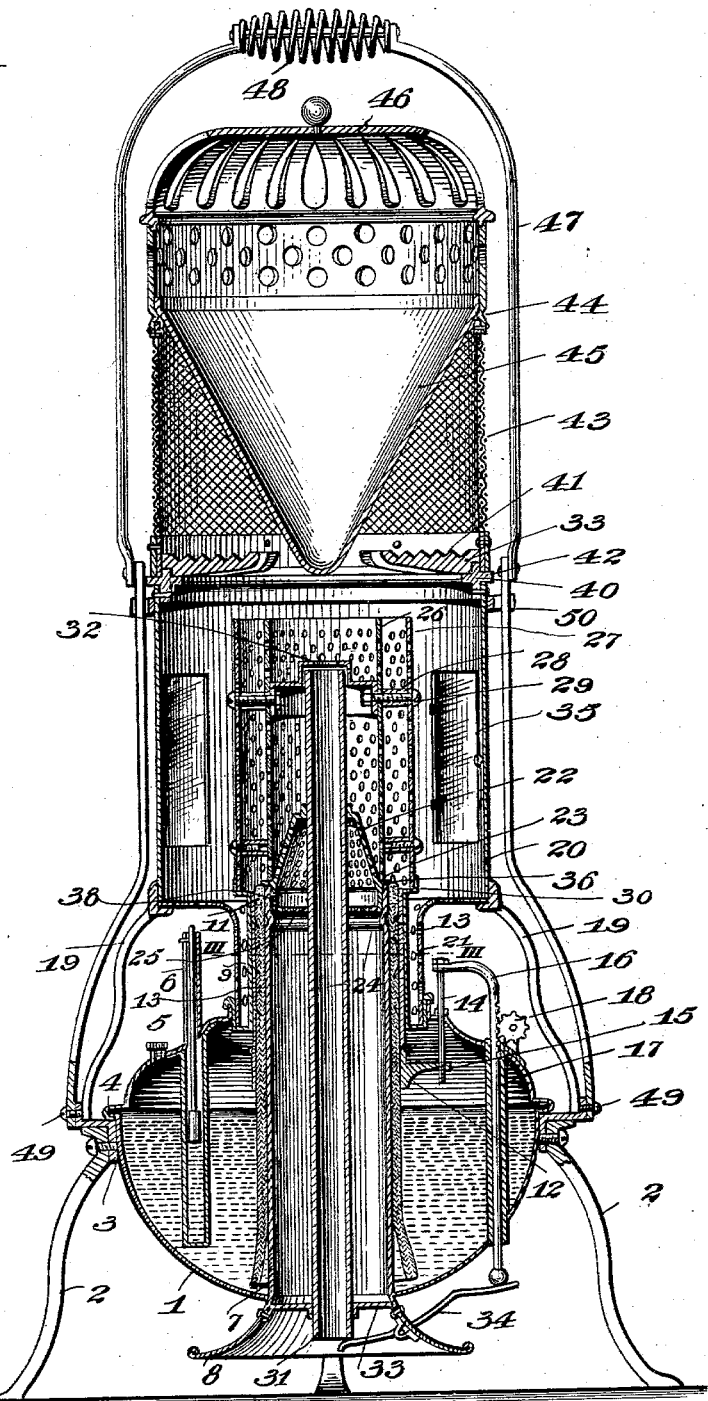
Fig. I
Witnesses
Edmund A. Strause
W. S. Boyd.
Frank J. Smith Inventor
by Townsend Bros
his attys.

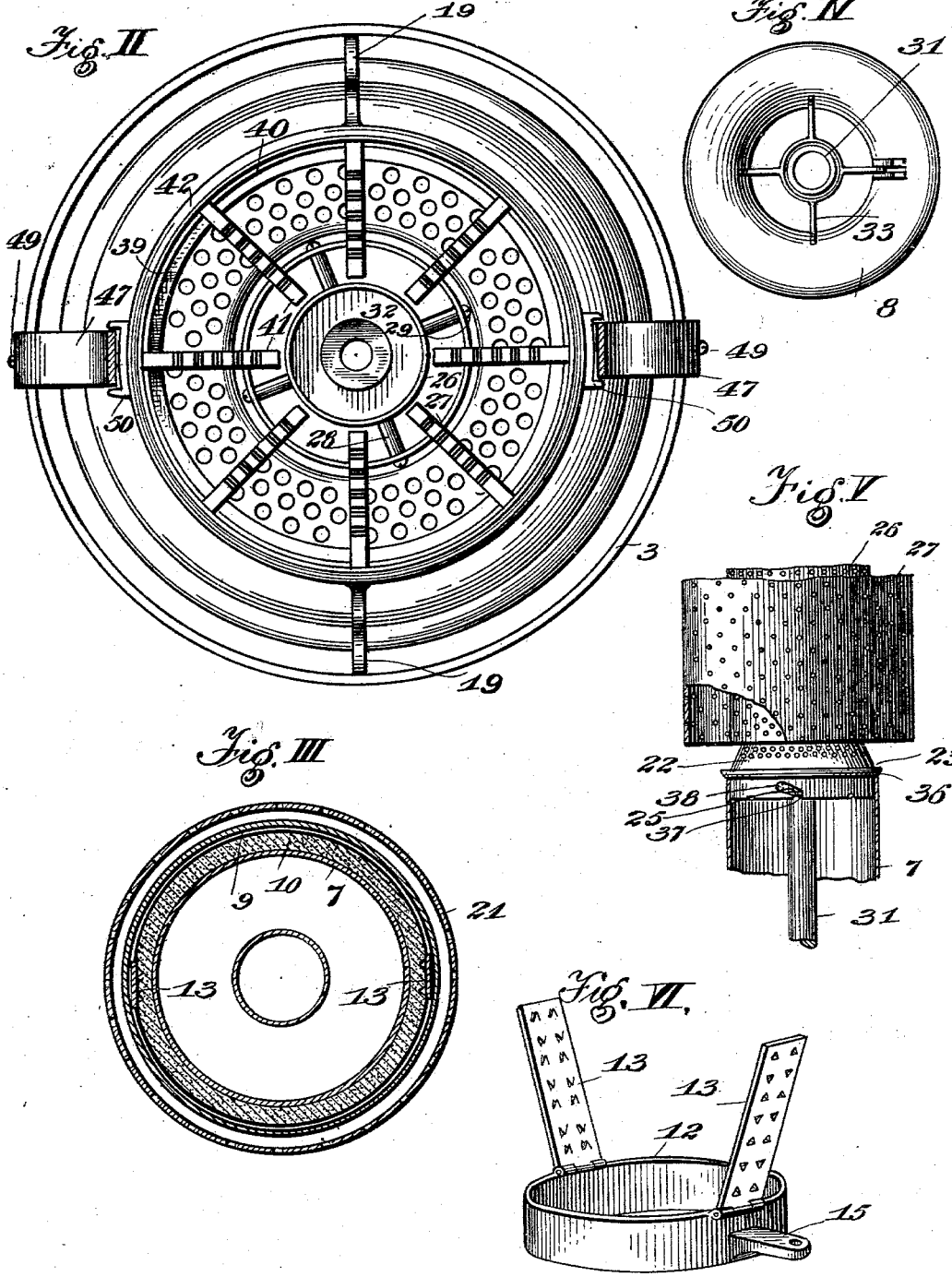

No. 740,705.                                              Patented October 6, 1903.

UNITED STATES PATENT OFFICE.

FRANK J. SMITH, OF LOS ANGELES, CALIFORNIA.

COMBINED HEATING AND COOKING STOVE.

SPECIFICATION forming part of Letters Patent No. 740,705, dated October 6, 1903.

Application filed March 27, 1902. Serial No. 100,305. (No model.)

*To all whom it may concern:*

Be it known that I, FRANK J. SMITH, a citizen of the United States, residing at Los Angeles, in the county of Los Angeles and State of California, have invented a new and useful Improvement in a Combined Heating and Cooking Stove, of which the following is a specification.

My invention relates to stoves, and more particularly to that class of combined stoves which are used for heating and cooking purposes, and has for one of its objects to produce a stove which is portable and can readily be changed to adapt it to the particular use for which it is to be applied.

Another object is to produce a stove in which the different parts may be easily separated for the purpose of cleansing and be as quickly assembled for use.

Another object is to provide means for separating the vaporizer or burner from the wick portion, whereby the oil is prevented from creeping or spreading over the burner when not in use; and a still further object is to provide the top or heater portion with a conical radiator, by means of which the heat is deflected laterally or thrown out into the room, as well as radiated vertically and laterally.

In warm or semitropic countries it is often very desirable that a heater of some kind be used that will quickly warm the air within the room without overheating it and without producing a disagreeable smell or odor. This is accomplished by using my invention in its complete form; but when it is desired to utilize the stove for heating articles or cooking the top portion of the stove is removed, which permits of access being had more directly to the flame. When the burner portion of the stove is to be cleansed or repaired, it can be removed from the lamp or reservoir portion and so separated that free access can be had to all parts thereof for any purpose. The lamp portion is preferably of such size as to hold a sufficiency of oil or fuel to permit the stove being used for either purpose a considerable length of time without being refilled.

My invention virtually consists, broadly, of three separable portions—a lamp or fuel-reservoir, a burner or vaporizer, and a heater or radiator; and it consists specifically in the novel construction and arrangement of parts of a stove, as will be hereinafter set forth.

The accompanying drawings illustrate the invention.

Figure I is a vertical sectional view of one form of combined heater and stove embodying my invention. Fig. II is a top view of the stove with the top removed and the supporting-legs omitted, the bails being shown in section. Fig. III is an enlarged transverse sectional view on the line III III of Fig. I. Fig. IV is a bottom plan view of a portion of the stove. Fig. V is an enlarged broken elevation showing the separation of the burner from the wick. Fig. VI is a perspective view of a portion of the wick-raising apparatus.

Referring more particularly to the drawings, 1 designates the lamp or fuel-reservoir, which may be of any suitable size and shape and is preferably supported upon legs 2. By securing the legs together at the top, as by means of a suitable collar 3, and providing the lamp with a flange 4 the lamp may be removably supported upon its legs with the bottom at a suitable distance above the floor to permit of a free circulation of air below it. The lamp may be provided with the usual screw-cap filling-plug 5 and indicator 6.

Extending vertically through the reservoir is a tube 7, which acts as a flue for supplying the interior of the burner with air and has its lower end preferably connected with or expanded into an inverted funnel or bell-shaped mouth 8. The upper end of the tube extends some distance above the top of the reservoir and is surrounded by a wick-tube 9, which is detachably connected at its lower end to the top of the reservoir. An ordinary cylindrical wick 10 surrounds the tube 7, with its upper end fitting closely between the upper end of said tube and the wick-tube 9. If desired, the upper end of the wick may be formed or provided with an asbestos tip 11, which will prevent the burning or destruction of the wick. The wick is raised and lowered by any suitable mechanism; but I have shown a collar 12, which fits around the wick below the lower end of the tube 9 and is provided with pronged wings 13, which fit between the wick and the tube 9, with the prongs sticking into the wick, so as to move it up or down as the collar is moved. The collar may be moved by any suitable means, as a rod 14, which is secured in a projection 15 at one side of the collar and has its other end projecting through the top of the reservoir. To facilitate the movement of the rod, I prefer to connect its other end with one end of an L-shaped rod 16, the other end of said rod projecting down through a tube 17 in the reservoir. The intermediate portion of the rod 16 above the reservoir is provided with a rack, with which an ordinary toothed wheel 18 engages, by the rotation of which the wick is raised and lowered in the usual manner.

Supported above the reservoir by any suitable means, as legs 19, is a shell or casing 20, within which is located the burner. If desired, the casing may be creased or beaded near the top and bottom to add to its strength and appearance. The lower ends of the legs 19 may be supported directly over the upper ends of the legs 2, or they may be placed at other points when the collar 3 is used. The upper ends of the legs 19 are preferably shouldered and may be secured to the lower end of the casing 20 by means of ordinary rivets or screws. (Not shown.) A perforated tube 21 surrounds the wick-tube 9 and is at a sufficient distance therefrom to permit of the entrance of air into the interior of the casing. The lower end of the tube may be seated in a cavity in the top of the lamp, and its upper end is preferably flanged or expanded out to the lower edge of the casing and rests in the shoulders of the legs 19, thereby forming a perforated bottom for the casing, through which air may freely pass. Seated in the upper end of the tube 7 is a shell 22, the lower end of which is cylindrical, and the upper end is frusto-conical and foraminated, with a shoulder 23 formed between the cylindrical and the conical portions. The lower end of the shell rests upon a bead 24, formed near the upper end of the tube 7, and is provided with a bottom 25, formed from a foraminated plate, provided with a central opening. The bottom 25 acts as a shield to prevent the admission of sudden gusts of air to the flame, which might blow it out or make it smoke.

Surrounding the shell 22 and extending a suitable distance above it is the burner portion of the device, which consists of two concentric foraminated shells 26 and 27, which are equally spaced from each other at all points by means of short tubes 28 and bolts 29. The interior diameter of the inner shell 26 is just sufficient to fit around the lower end of the conical portion of the shell 22 and rest upon the shoulder 23, while the lower end of the outer shell 27 rests upon a flanged extension 30 at the top of the wick-tube 9. The shells 26 and 27 are preferably of the same length, and the supports for the lower ends are located at the top of the wick, and the parts are so constructed that it is impossible for air to strike the flame directly at the wick, thereby preventing the formation of smoke, which would pass up through the burner and produce a disagreeable odor or smell.

Passing up loosely through the tube 7, through the perforated bottom 25 and the top of shell 22, is an auxiliary draft-tube 31, which engages with its upper end a centrally-perforated cupped plate or support 32, which is secured near the upper end of the interior shell 26. By locating the plate at a proper distance from the top and bottom of the tube 26 the correct amount of air is permitted to pass out into the flame to produce perfect combustion, and thereby avoid the disagreeable smell or odor which would otherwise result. The lower end of the tube 31 extends down into the funnel or mouth of the tube 7 and is centered by means of a spider 33. A lever 34 is pivotally mounted in one side of the funnel 8, with its inner end in engagement with the lower end of the tube 31 and its outer end in position to be engaged by the lower end of the L-shaped rod or rack-bar 16. The rod, the auxiliary tube, and the wick are so arranged relatively to each other that when the wick is turned down to put out the flame the lower end of the rod will force the outer end of the lever down and the inner end up to such an extent that the upward movement of the auxiliary tube will automatically lift the burner-shells entirely out of contact with their supports, and thereby prevent the escape of oil from the wick onto the burner. If the burner were not thus separated from the wick-tube and the lamp were not used for some time, the oil would naturally creep or spread over the lower portions of the shells and dust would collect thereon to such an extent that when the stove would be subsequently used it would smoke until after the heat of the flame had burned off the oil and dust that would collect in the holes of the shells and prevent the free admission of air.

When it is desired to light the burner, the wick is turned up a sufficient distance which will permit of the reseating of the burner around the top of the wick ready for operation. The finger is then applied to the outer end of the lever 34 and the lever pressed down sufficiently to cause its inner end to elevate the auxiliary tube, and with it the burner, far enough above the top of the wick to permit of a match being applied thereto, which can be done through a suitable door or opening 35 in one side of the casing 20. As soon as the wick is lighted the finger is removed from the lever, and the weight of the burner and tube will bring the parts into their normal position, the conical shape of the shell 22 causing the lower end of the burner to be always properly seated on the shoulder of the shell. The shoulders that form the seats for the lower end of the burner are so small that it is impossible for small objects to collect thereon and prevent the proper seating of the burner. To prevent the wick being turned up so far as to cause the stove to smoke, I provide a stop to automatically limit the upward movement of the wick. The form of stop I prefer is located in the path of the wick, so as to engage therewith and prevent its movement above a certain point. In the drawings this stop is shown as a flange 36, which extends outwardly from the shoulder 23 on the shell 22 in position to engage with the top of the wick and keep it from being turned up too high. The flange may be slightly flared upward, so as to deflect the blaze outward without interfering with its size or intensity. To prevent the wick from carrying the shell upward, the shell may be connected with the draft-tube in any manner, as by means of a shoulder or bayonet-slot 37, which fits over a pin 38 in the top of the tube 7. This will permit of the shell being removed at any time by partially rotating it, but will prevent its being forcibly pushed upward by the wick.

Seated in the upper end of the casing 20 is a grate or spider 39, which preferably consists of an exterior flanged ring 40, from which arms 41 extend radially inward. The arms preferably terminate at a short distance from the center and may each be provided upon its upper surface with teeth or notches to better retain articles that are placed thereon for heating. A flange 42 upon the exterior of the spider forms upper and lower shoulders, the lower shoulder forming a support for holding the spider in the interior of the upper end of the casing and the upper shoulder forming a support for a foraminated shell or casing 43. The spider is preferably secured permanently in the upper end of the casing 20, as by screws or rivets; but the shell 43 fits loosely upon its seat, so that it can be readily removed for the purpose of converting the device from a heater to a cooking-stove. The shell 43 may be formed from foraminated sheet-iron or from woven wire, as desired, or partly of both. Supported within the shell 43, as by means of a shoulder 44, is an inverted cone 45, the lower end of which extends down to a point adjacent to the inner ends of the arms 41 and at sufficient distance above the top of the burner and in axial alinement therewith to engage with the contracted annular flame issuing from the top of the burner and evenly and uniformly spread it out, and thereby cause the heat to be deflected or thrown out through the perforations of the shell 43 into the room. As the cone becomes heated it will radiate its heat interiorly and vertically, which will pass up and out through the upper portion of the shell into the room, thereby diffusing the heat throughout the room in a uniform manner. The radiation or diffusion of the heat from the upper portion of the casing is increased by means of an open-work top 46 of any suitable material, as cast-iron. The top 46 can be made in any suitable shape or outline to add to the artistic design and appearance of the stove.

For the purpose of readily lifting and transporting the stove from one place to another I prefer to provide it with a jointed bail 47, the upper end of which may be provided with any suitable non-heating arrangement, as a coil 48. The lower ends of the bail are preferably connected with the upper ends of the legs 2, as by means of the collar 3 and ordinary pivots 49. The intermediate portion of each leg of the bail engages with a retainer, as notched or shouldered projections 50, near the upper end of the casing 20, which will prevent the tipping of the stove when it is being lifted. The upper portion of the bail is pivotally secured to the lower portion at a point directly below the upper surface of the arms 38 of the spider, so that when the top is removed for using the device as a cook-stove the upper portion of the bail may be turned down and will be entirely out of the way of any article that may be placed upon the spider.

As above described, it will be seen that my improved stove can be readily transported from place to place as desired and that it can be quickly converted from one use to another by simply removing or replacing the upper shell or casing. When used as a cooking-stove, the desired article may be placed upon the spider where it will be exposed to the direct action of the flame which issues from the top of the burner and be thereby quickly heated. As the air in sufficient quantities for perfect combustion is admitted to the interior and the exterior of the annular wall of flame as it passes from the wick to the top of the burner, there is no odor or unconsumed gas escaping into the room and no soot nor dirt to collect upon the parts of the stove or article that may be placed thereon. In addition to the air that is drawn into the lower end of the main draft-flue through the funnel-shaped mouth at the bottom of fuel-reservoir, which is located near the floor, a current of air is constantly passing up through the auxiliary draft-tube and escaping at its upper end through the perforation of the support or bracket in the burner, which will assist in the combustion and will form an auxiliary blaze at its upper end directly in the center of the main flame, thereby adding to the effectiveness of the stove.

When it is desired to clean or replace any portions of the burner, the upper casing is removed and the bails sprung outwardly from engagement with their supports or retainers at the upper end of the heater-casing and turned down to one side. The casing around the heater may then be removed, with or without its supporting-legs, and the two burner-shells lifted off their seats. The auxiliary tube can then be withdrawn and finally the conical shell at the upper end of the wick. This will give free access to the upper end of the wick for trimming or replacement, after which the parts can be quickly assembled by simply slipping them back into their original positions. After the stove has been lighted its flame can be controlled so as to generate the desired amount of heat by turning the wick up or down in the usual manner, the wick-controlling mechanism being out of engagement with the lever for controlling the auxiliary tube and the burner until after the wick has been turned down far enough to extinguish the blaze of the stove; but when the wick is turned down to extinguish the flame the lever is rocked on its pivot, which will cause the inner end to move the auxiliary tube upward, and thereby lift the burner off its seat and hold it there until the wick is again moved upward for use. The further movement of the wick after it is lighted will virtually disengage its operating mechanism from the lever, and thereby prevent the control of the wick from interfering with the burner-shells.

Although I have shown and described what I consider a very desirable form of constructing my combined stove and heater, I reserve to myself the right to make all such changes and alterations therein as will come within the scope of my invention.

Having thus described my invention, I claim—

1. In a combined stove and heater, a fuel-reservoir provided with a suitable burner, an annular flanged ring about said reservoir, said reservoir provided with a flange adapted to rest upon said flanged ring, legs for said reservoir supported from said flanged ring, a heater detachably supported over said reservoir on legs attached to said flanged ring, said heater provided with heat-radiating means adapted to distribute the heat laterally from the stove.

2. In a combined stove and heater, a fuel-reservoir, a burner in connection therewith, an annular flanged ring about said reservoir, said reservoir provided with a flange adapted to rest upon said flanged ring, legs for said reservoir supported from said flanged ring, a heater detachably supported over said reservoir on legs resting on said flanged ring, a spider with an open center provided above said burner, and an inverted conical heat-deflector suspended in said heater above said spider and having its small end projecting into the central opening thereof.

3. In a combined stove and heater, a fuel-reservoir provided with a draft-tube and a wick, a collar surrounding the wick and provided with pronged wings for engaging therewith, a rod secured to said collar and projecting above the top of the reservoir, an L-shaped rack-bar secured at its upper end to said rod and having its lower end projecting below the reservoir, a toothed wheel for moving said bar vertically, a burner loosely mounted above the wick, an auxiliary draft-tube through the main draft-tube, and a lever mounted below the reservoir with one end in engagement with the lower end of the auxiliary tube and the other end in position to be engaged by the lower end of the rack-bar.

4. In a combined stove and heater, a reservoir provided with a draft-tube and a wick-tube, a foraminated frusto-conical shell at the upper end of said tubes, a foraminated bottom for said shell, and a foraminated double-walled burner seated on the shoulder of said shell.

5. In a combined stove and heater, a fuel-reservoir provided with a draft-tube and a wick-tube the draft-tube being shouldered near its upper end, a shell in the upper end of the tube, the lower end of which is cylindrical, and the upper portion is frusto-conical and foraminated, and the intermediate portion is shouldered, a foraminated bottom for said shell, and a foraminated double-walled burner seated upon said shoulder.

6. In a combined stove and heater, a fuel-reservoir provided with a draft-tube and a wick-tube, the upper end of the draft-tube being shouldered and the lower end provided with a guide, a shouldered foraminated conical shell seated upon the shoulder in the upper end of the tube, a centrally-perforated foraminated plate at the bottom of the shell, a foraminated double-walled burner seated on the shoulder of the shell, a centrally-perforated cupped support in said burner, an auxiliary draft-tube through the guide at the bottom of the main draft-tube, through the centrally-perforated plate, and through the top of the shell and in engagement with the cupped portion of the support in the burner, and means for moving the auxiliary tube and burner vertically.

7. In a combined stove and heater, a fuel-reservoir provided with a draft-tube and a wick-tube, the upper portion of the draft-tube being shouldered internally and the upper end of the wick-tube being expanded to laterally form a shoulder and flange, a shouldered foraminated conical shell removably seated on the shoulder of the draft-tube, and a double-walled foraminated burner seated on the shoulder of the shell and the shoulder of the wick-tube, and means for moving the burner vertically.

8. In a combined stove and heater, a fuel-reservoir provided with a draft-tube and a wick-tube, a foraminated double-walled burner, a casing around the burner and provided with a door, a foraminated tube surrounding the wick-tube, the upper portion of which is expanded laterally and forms a perforated bottom for the casing, shouldered legs for supporting said casing above the fuel-reservoir and means for moving the burner vertically.

9. In a combined stove and heater, a fuel-reservoir, a burner, a shouldered grate above the burner and a foraminated casing removably seated on said grate and provided with an inverted conical deflector in axial alinement with the burner.

10. In a combined stove and heater, a fuel-reservoir, a burner and a casing above the reservoir, a radially-armed grate, the exterior of which is flanged annularly and rests upon said casing, and a foraminated casing removably seated upon said flange and provided with an inverted conical deflector in axial alinement with the burner.

11. In a combined stove and heater, a fuel-reservoir a burner and a casing above the reservoir, a grate in the upper end of the casing, the exterior of which is flanged annularly and the interior is provided with radial arms, said arms terminating at a distance from the center, a foraminated casing removably seated upon the flange of the grate, an inverted conical deflector within said last-mentioned casing, the apex of which is adjacent to the arms of the grate and in axial alinement with the burner.

In testimony whereof I have signed my name to this specification, in the presence of two subscribing witnesses, at Los Angeles, California, this 18th day of March, 1902.

FRANK J. SMITH.

Witnesses:
 W. S. BOYD,
 F. M. TOWNSEND.